United States Patent
Middleton, Jr.

[15] 3,665,995
[45] May 30, 1972

[54] DIAPHRAGM BEAD SPREADER

[72] Inventor: Irvin E. Middleton, Jr., Akron, Ohio
[73] Assignee: The General Tire & Rubber Company
[22] Filed: Nov. 4, 1969
[21] Appl. No.: 873,876

[52] U.S. Cl. .......................................................157/1.1
[51] Int. Cl. .....................................................B60c 25/12
[58] Field of Search.............................157/1.21; 152/350

[56] References Cited

UNITED STATES PATENTS

| | | | |
|---|---|---|---|
| 2,699,194 | 1/1955 | Iknayan | 152/350 |
| 2,712,339 | 7/1955 | Hurt | 152/350 |
| 2,766,006 | 10/1956 | Kraft | 157/1.21 X |

Primary Examiner—Granville Y. Custer, Jr.
Attorney—Frank C. Rote, Jr. and Harry F. Pepper, Jr.

[57] ABSTRACT

The disclosure is concerned with an improved annular, expansible diaphragm for spreading the beads of a pneumatic tire for purposes of mounting the tire on a rim and/or inserting an inner tube, if desired. The diaphragm features an outer, annular, restraining layer comprising at least two fabric plies, with oppositely directed mutually parallel reinforcing cords disposed at an acute angle relative to the circumferential center-line of the diaphragm. An inner, annular, tread engaging layer comprises at least one fabric ply comprising mutually parallel reinforcing cords disposed at an angle of substantially 90° relative to the circumferential center-line of the diaphragm. An annular, tubular, air-tight bladder member is sandwiched between the outer and inner layers, which is inflatable through a valve disposed in the outer diameter of the tube.

6 Claims, 3 Drawing Figures

Patented May 30, 1972
3,665,995
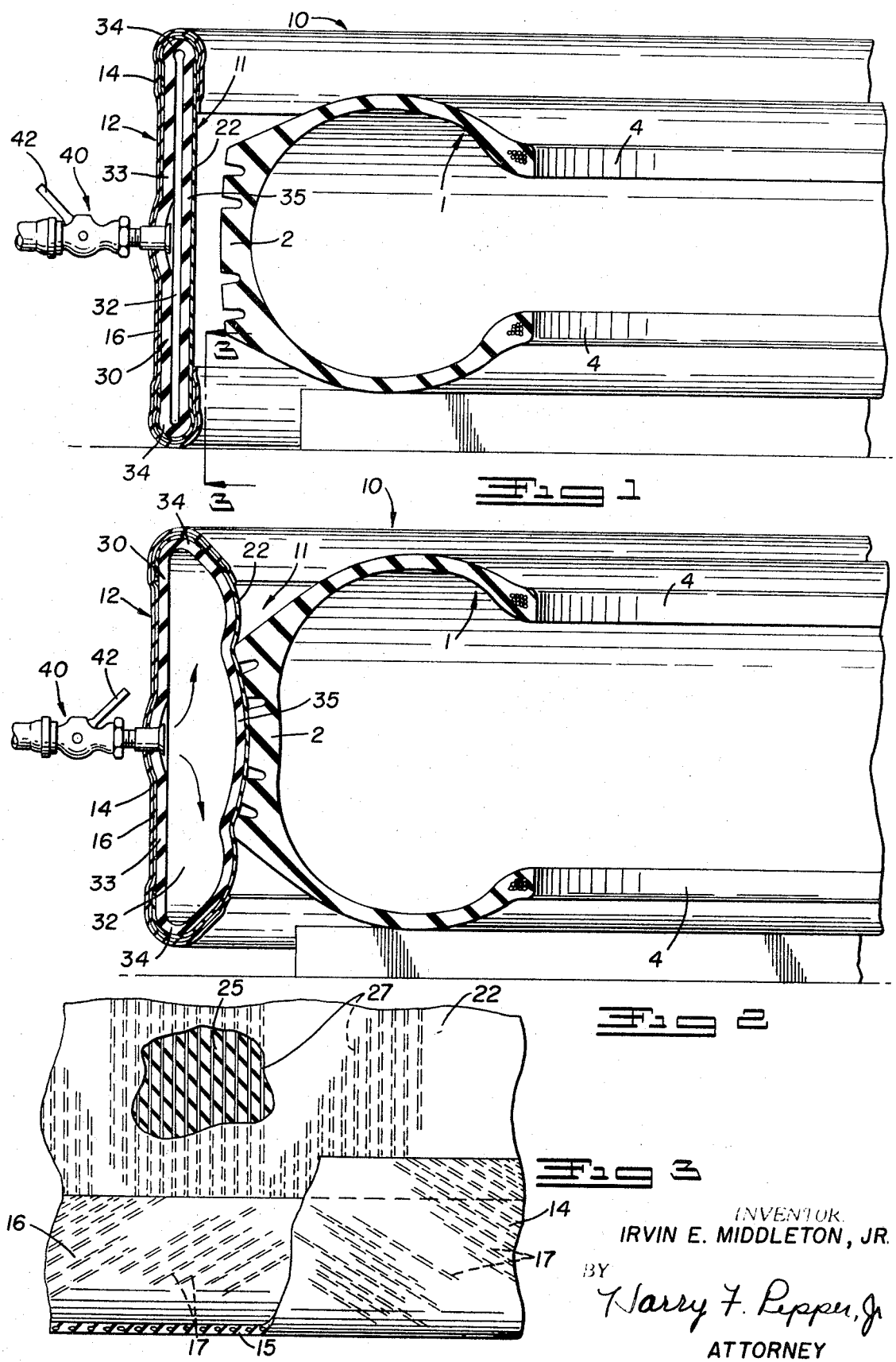
INVENTOR.
IRVIN E. MIDDLETON, JR.
BY
Harry F. Pepper, Jr.
ATTORNEY

DIAPHRAGM BEAD SPREADER

BACKGROUND OF THE INVENTION

The invention relates to an improved annular diaphragm and particularly to such a diaphragm which is used to forcibly engage the periphery of a pneumatic tire in order to spread the tire in an axial direction.

In preparing pneumatic tire casings for use on vehicles, it is usually necessary to forcibly widen the spacing of the bead portions thereof. For example, in tubeless pneumatic tires, in order that the casing be mounted properly on the rim, it is necessary that the bead portions be spread apart along the rim face before inflation is possible. Simply placing a rim in the central opening of the tire and inflating will cause the inflation medium to escape between the beads and the rim face. Also, when the casing is to be used in combination with an inner tube, the bead portions must be spread apart to allow wider access to the interior of the tire so that the tube may be inserted.

Because of stiffened construction in the beads, spreading the tire in this area is very difficult. Storing and shipping tires in stacks further adds to this difficulty in that the pair of annular portions on a given tire sometimes settle to within a spacing of a few inches.

Many ingenious tools and other means have been devised to aid in proper spreading of casings for this purpose. Some of these are quite simple and require some degree of physical exertion by a person working with the tire, while others are quite sophisticated requiring little or no human exertion.

One simple means which has been devised for this purpose requiring little or no physical exertion is the diaphragm bead spreader. The device is basically a ring-like or annular, inflatable diaphragm positioned to forcibly contact the peripheral tread portion of the tire. Inflation of the diaphragm effects radially inward force against the tread of the tire causing the tire to spread or widen in an axial direction. Such a means has been disclosed and claimed in U.S. Pat. No. 2,766,006 to H. T. Kraft and assigned to the assignee of the present invention. This patent describes the invention by way of two basic embodiments. The first embodiment is directed to a diaphragm spreader which is mountable on a wall. The second embodiment is directed to a more portable unit which comprises a ring-shaped or annular, air-tight tube, the radially outer surface of which is restrained by a layer of square woven fabric. A valve registers through the radially outer wall of this diaphragm and serves as a means for inflating and deflating the diaphragm. When the diaphragm is inflated, the radially inner, substantially unrestrained portion of the tube engages the tire surrounded by the diaphragm and forces the tire to spread axially, thereby increasing the axial spacing between the stiff bead portions thereof. This particular embodiment has been found highly effective in mounting many types of tubeless passenger tires on rims. However, problems exist when attempting to use this particular diaphragm design to spread some of the larger passenger tires and small truck tires. The problems exist simply because these larger tires are of stronger construction and the radially inner, tread engaging surface of the diaphragm either slips from the tread or balloons out around the tread before any appreciable spreading occurs. Also, this inner surface wears rapidly when used in this way.

SUMMARY OF THE INVENTION

It is an object of the present invention to provide an improved annular diaphragm for forcibly engaging the periphery of a tire to spread the bead portions thereof, thereby facilitating mounting of the tire on a rim and/or greater access to the tire interior.

It is another object of the present invention to provide a stronger and more stable tire spreading diaphragm than has heretofore been provided.

It is a further object of the present invention to provide an improved tire spreading diaphragm capable of use on larger tires than heretofore possible.

Briefly, the invention consists of a diaphragm bead spreader which includes an outer restraining layer comprising elastomeric plies which contain parallel cords disposed at an acute angle to the circumference of the diaphragm and an inner tire engaging layer which includes an elastomeric ply or plies having cords disposed at substantially a 90° angle relative to the circumference of the diaphragm. Intermediate these two layers is an annular elastomeric air-tight tube or bladder member which is inflated through a valve to move the tire engaging layer into contact with the tire periphery.

BRIEF DESCRIPTION OF THE DRAWINGS

FIG. 1 is a sectional view of a diaphragm made according to the present invention positioned to engage a tire also shown in section.

FIG. 2 is a view similar to FIG. 1 showing inflation of the improved diaphragm to a point where the inner surface thereof has engaged and spread the tire.

FIG. 3 is a view along lines 3—3 in FIG. 1 showing the specific orientation of the cords in the inner and outer layers of the diaphragm, with certain parts being omitted, broken away and shown in section.

PREFERRED EMBODIMENT OF THE INVENTION

In a preferred form as shown in the drawings, where like numerals refer to like parts, the diaphragm 10 is shown as including a circumferential, outer restrained surface 12, and an inner extensible surface 11. The diaphragm is annular and the inner diameter is such that the diaphragm will fit around a selected range of tire peripheries.

As seen in FIGS. 2 and 3 the core of the diaphragm 10 is an elastomeric tube or bladder member 30, which forms an air-tight, inner cavity 32. A valve member 40 registers with cavity 32 through the radially outer wall 33 of the member 30. As seen in FIG. 2 when the tube or bladder member 30 is inflated through the valve 40, only the inner wall 35 thereof extends. The tube member 30 is made of a typical elastomeric composition with air retention properties, such as those compositions used in tire inner tubes and the like. The respective inner and outer wall thicknesses are parameters which are selectable depending upon the particular uses to which the diaphragm is to be put. The inner wall 35 and outer wall 33 of tube 30 are shown of equal thickness, however, they may be of different thicknesses if desired.

The radially outer wall 33 of tube member 30 is restrained or constricted by a pair of cord reinforced elastomeric plies 14 and 16. The plies 14 and 16 co-extend annularly with the outer wall 33. The outer ply 14 is slightly wider than the inner ply 16, and both extend around the marginal edges or corners 34 of tube 30 and terminate inwardly of these corners along the inner surface 11 of the diaphragm 10.

As seen particularly in FIG. 3, the plies 14 and 16 are principally composed of a suitable elastomeric compound 15 reinforced by spaced, mutually parallel cords, such as 17. The plies 14 and 16 are essentially similar to the "bias-type" plies used in pneumatic tire carcass construction. The cords 17 may be composed of any one of the suitable "textile-type" materials commonly used as ply cords, such as cotton, rayon, polyester or glass. Nylon is preferably not used for reasons to be explained hereinafter. As seen further in FIG. 3, the cords 17 are disposed so that they lie at an acute angle relative to the circumferential center-line of the diaphragm 10 (not shown). Also, as seen in FIG. 3 the cords 17 in ply 16 extend in an opposite direction relative to the cords 17 in ply 14. In other words, the cords in a given ply such as 16 are to cross the cords of an adjacent ply, such as 14. The construction shown specifically demonstrates that this outer restraining layer constitutes two plies, however, any number of plies may be used. When using additional plies, however, it is preferred that the total number of plies is an even number so that the total outer restraining layer is structurally balanced.

The inner wall 33 of the tube or bladder member 30 is provided with a single ply 22 which co-extends annularly therewith. The ply 22 extends around the corners 34 of the tube 30 and terminates inwardly of these corners along the outer surface 12 of diaphragm 10. It should be noted that the ply 22 preferably passes inside of the plies 16 and 14. However, it can also extend outside these plies, if desired.

Referring again to FIG. 3, the inner ply 22 is shown composed of an elastomeric compound 25 reinforced by mutually parallel cords 27. These cords are disposed so as to lie at substantially a 90° angle relative to the circumferential center-line of the diaphragm 10. The cords 27 may also be of any of the aforementioned suitable materials such as cotton, rayon, polyester or glass. While one ply 22 is shown, it is understood that the inner surface 33 of tube 30 may be lined with a plurality of plies such as 22.

As seen in FIG. 2, inflating fluid entering through valve 40 will move the radially inner wall 35 of member 30 inwardly, causing inner surface 11 to engage the tread 2 of tire 1. As inflation of member 30 increases, the bead portions 4 of tire 1 will spread as shown in FIG. 2. When the bead portions 4 have sufficiently spread for completing a desired operation, for example, inflation of a tire on a rim (not shown), the tubular member 30 and thus the diaphragm 10 may be deflated through the valve 40 by a conventional adjustment, such as lever 42.

It has been found that the diaphragm 10 with its outer restraining bias-type plies 14 and 16 and its inner tread engaging "radial-type" ply or plies is efficient over a wider range of tire sizes and strengths than heretofore. The bias-ply outer restraining layer affords a sufficient strength against the outer wall 33 of tube 30, so that diaphragm 10 can be used on nearly all types of passenger tires as well as many of the smaller truck sizes. The inner ply 22, prevents the ballooning of the inner wall 33 over the shoulders of the tread and the disposition of the cords 27 effects a grasping action upon the tire which prevents slippage of the inner surface 11 relative to the tire 1.

The diaphragm 10 is preferably an integrally cured unit; i.e., the structural components thereof are cured and shaped as a composite in a suitable mold. Diaphragm 10 may be assembled prior to curing by steps similar to the building of a tire. For example, the ply 22 may be laid over and centered upon a rotable drum of selected diameter. A precured tubular member such as 30 is placed over the ply 22 in proper position. Since the tube 30 is preferably precured, it is necessary that the outer surface of the tube be treated with a cement so that temporary adhesion will exist between it and the uncured or "green" plies during building. The edges of ply 22 are then turned up and over the margins or corners 34 of member 30. The valve 40 can be already seated in tube 30 prior to its placement on the drum, or it may be applied through the wall 33 after placement of the tube 30 on the drum. The two outer restraining plies 14 and 16 are preferably preformed as a band for one-step placement on the drum, or alternatively, can be positioned separately in two steps. Whether applied as a band, or individually, provision must be made for the passage therethrough of the valve 40. The inner and outer plies 16 and 14 are turned down over the corners 34 of member 30. The assembly is then pressure stitched to assure mutual adhesion between the component parts. The assembled structure is then taken from the drum and cured in a suitable mold.

As mentioned previously, nylon is not a preferred material for use as cords in the diaphragm 10. This is because of the tendency of nylon to shrink and stretch under fluctuations in temperature. While this characteristic is sometimes desirable in tire cords, it is preferred that cords used in diaphragms such as 10 are dimensionally unaffected by temperature, in order that the structural integrity of the device remain constant.

While there are many obvious modifications which are apparent from, but not specifically disclosed in, the preceding description, it is felt such modifications fairly fall within the spirit of the inventive concept.

What is claimed is:

1. A ring-like diaphragm adapted to forcibly engage the tread portion of a pneumatic tire casing to thereby spread apart said casing comprising
   A. a radially outer, annular, restraining layer including
      1. an even number of elastomeric plies reinforced with spaced, substantially mutually parallel cords disposed at an acute angle relative to the circumferential center-line of said diaphragm,
   B. a radially inner, annular, tire engaging layer including
      1. at least one elastomeric ply reinforced with spaced, substantially mutually parallel cords disposed at substantially a 90° angle relative to said circumferential center-line of said diaphragm, and
   C. an annular, inflatable, elastomeric, tubular member providing an air-tight cavity intermediate said restraining and tread engaging layers.

2. The diaphragm as defined in claim 1 wherein the reinforcing cords in one of said plies of said outer restraining layer extend in an opposite direction relative to the reinforcing cords in an adjacent ply.

3. The diaphragm as defined in claim 1 further comprising a valve means whereby said tubular member may be inflated and deflated.

4. The diaphragm as defined in claim 2 further comprising a valve means whereby said tubular member may be inflated and deflated.

5. The diaphragm as defined in claim 3 wherein said valve means is disposed in the outer periphery of said diaphragm and registers with said tubular member through said outer restraining layer.

6. The diaphragm as defined in claim 4 wherein said valve means is disposed in the outer periphery of said diaphragm and registers with said tubular member through said outer restraining layer.

* * * * *